Jan. 17, 1939.  M. SKOLNICK  2,144,551
WALL AQUARIUM
Filed April 10, 1937
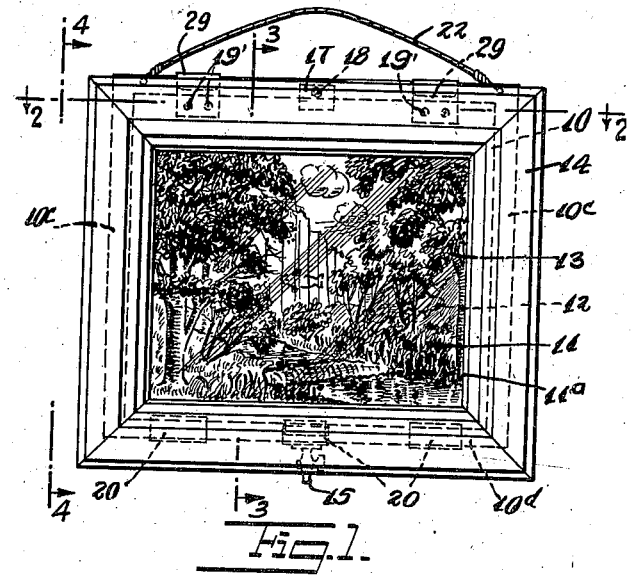
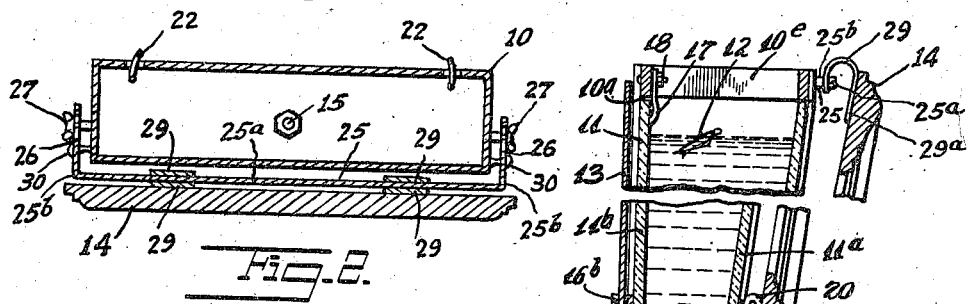
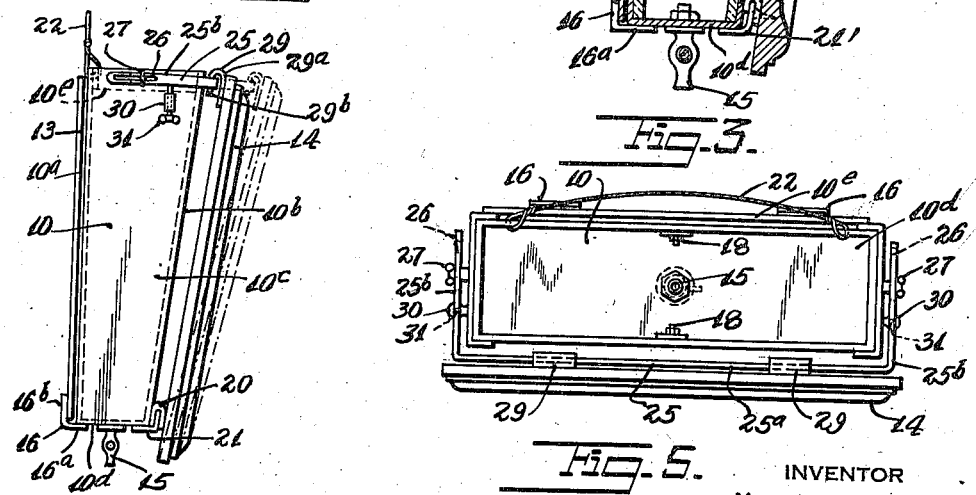
INVENTOR
MORRIS SKOLNICK
BY
ATTORNEY Patented Jan. 17, 1939

2,144,551

UNITED STATES PATENT OFFICE 2,144,551

WALL AQUARIUM

Morris Skolnick, New York, N. Y.

Application April 10, 1937, Serial No. 136,080

3 Claims. (Cl. 119—5)

This invention relates to new and useful improvements in a wall aquarium.

More specifically, the invention contemplates the provision of a frame structure into which a transparent receptacle for water and aquarium objects may be placed.

Still further the invention provides for a novel manner for attaching a removable picture to the rear of the transparent aquarium and a removable picture frame to the front of the transparent aquarium and then supporting the entire device on a wall, so that both the picture and the frame can be removed while the transparent aquarium is cleaned and thus preserve the picture and the frame.

Still further the invention provides that the frame structure be constructed of a pair of spaced end walls, a bottom wall, and a top frame. The back of the frame structure is to be perpendicular with relation to the bottom wall so as to solidly abut the wall upon which it is mounted.

As another object of the invention it is proposed to have the front of the frame structure at an angle to the bottom wall and then support the picture frame on the front thereof parallel thereto so that the frame will assume a position which is customary when hanging picture frames.

Still further the invention provides for a drain cock to be mounted in the bottom wall of the aquarium to permit the water to be drained and changed without removing the device from the wall.

Still further the invention provides for a means for adjustably supporting the picture frame at various inclinations with relation to the front of the frame structure.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a front view of the wall aquarium constructed according to this invention.

Fig. 2 is a sectional view taken on the line 2—2 of Fig. 1.

Fig. 3 is a sectional view taken on the line 3—3 of Fig. 1.

Fig. 4 is an end view looking in the direction of the line 4—4 on Fig. 1.

Fig. 5 is a plan view of the device shown in Fig. 4.

The wall aquarium, according to this invention, comprises a frame structure 10 having an open flat rear side 10$^a$ and an open inclined front side 10$^b$. A transparent receptacle 11 for water and aquarium objects 12 is supported in the frame structure 10 and has front and rear sides 11$^a$ and 11$^b$ extending across the front and rear sides of the frame structure 10. A picture 13 is removably supported across the rear side of the frame structure 10 and is viewable from the front of the aquarium, and a picture frame 14 is supported on the front side of the frame structure 10 through which the aquarium and the picture may be viewed.

The frame structure comprises a pair of spaced end walls 10$^c$ and a bottom wall 10$^d$ extending therebetween and a top frame 10$^e$ into which the receptacle 11 is fitted. A drain cock 15 is fixedly mounted through the bottom wall 10$^d$ of the frame 10 and extends into the receptacle 11 for draining the water contained therein to permit the water to be easily changed without removing the device from the wall.

A pair of spaced clips 16 have one of their arms 16$^a$ fixedly attached to the bottom side of the bottom wall 10$^d$ and have the other of their arms 16$^b$ extending upward at right angles to the arms 16$^a$ and engaging across a portion of the rear face of the picture 13 for fixedly maintaining this picture in position on the frame structure 10. A clip 17 is fixedly held in position in the top frame 10$^e$ of the frame structure 10 by means of a bolt 18 and extends downward and into the receptacle 11 and engages against the inner face of the rear wall thereof to fixedly hold the receptacle against any forward movement.

A U-shaped clip 20 is fixedly attached to the bottom edge of the frame 14 in an inverted position and is adapted to engage over the top edge of an auxiliary clip 21 which is mounted on a portion of the bottom wall 10$^d$ of the frame 10. Thus the top clip 19 holds the frame 14 in position on the frame structure 10, while the bottom clip 20 tends to hold the frame 14 parallel to the open inclined front side 10$^b$ of the frame structure 10.

A means 22 comprising a string, wire or other suitable material is attached to the rear portion of the top frame 10$^e$ and is adapted to be used for positioning the wall aquarium upon a wall or other substantially vertical object.

A yoke 25 has a front arm section 25$^a$ and side arm sections 25$^b$ formed with elongated slots 26. The side arm sections 25$^b$ extend along the sides of the frame structure 10 and are adapted to have their elongated slots 26 engage clamp screws 27 which are fixedly mounted on the sides of the frame structure 10 to pivotally and longitudinally adjustably support the yoke 25. Clips 29 have one of their arms 29a fixedly attached to the top edge portion of the frame 14 and the other of its arms 29b engaging over the front arm section 25a of the yoke 25 to support the frame 14 in various positions.

A means is mounted on the frame structure 10 below the side arm sections 25a and engages the bottom edges of these arm sections to assist in supporting the yoke in all of its pivoted adjustments.

This means comprises bosses 30 which are fixedly formed on the sides of the frame structure 10 and provided with support screws 31 which threadedly engage through the bosses 30 and engage the bottom edges of the side arms 25b to prevent the yoke 25 from pivoting downward under its own weight or the weight of the frame 14 to disengage the front arm section 25a from beneath the clips 29.

The operation of this device is as follows:

Assuming that the position of the parts shown in Fig. 4 is one of its adjusted positions and that it is desired to have the frame at a greater angle with relation to the open inclined front side 10b of the frame 10. In order to make this angular adjustment the clamp screw 27 is loosened, to permit the yoke 25 to move forward to a position in which the clamp screw will abut against the rear edge of the slot 26. While this yoke 25 is moving forward the screw 31 must be turned to a lower portion to permit the yoke 25 to move downward to a position in which the clip 29 will maintain its engagement with the front arm section 25a. It will be noted that as the frame 14 moves forward it moves in an arc which causes the yoke 25 to pivot downward against the holding action of the support screw 31, making it necessary that this support screw also be lowered to permit the front arm section 25a to maintain its position with relation to the clips 29.

The pictures may also be painted directly on the transparent receptacle 11, or painted on both the transparent receptacle 11 and on the picture slide 13.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. A wall aquarium comprising a frame structure having an open flat rear side and an open inclined front side, a transparent receptacle for water and aquarium objects supported in said frame structure and having front and rear sides extending across the front and rear sides of said frame structure, a picture supported across the rear side of said frame structure and viewable from the front of said aquarium, and a picture frame supported on the front side of said frame structure through which said aquarium and said picture may be viewed, means for adjustably supporting said picture frame at various inclinations with relation to the open inclined front side of said frame structure, comprising a yoke supporting the top edge of said picture frame and having front arm sections and side arm sections formed with elongated slots and extending along the sides of said frame structure, clamp screws fixedly mounted on the sides of said frame structure and engaging through said slots to pivotally and longitudinally adjustably support said yoke, and means on said frame structure below said side arm sections and engaging the bottom face thereof to assist in supporting said yoke in all of its pivoted adjustments.

2. A wall aquarium comprising a frame structure having an open flat rear side and an open inclined front side, a transparent receptacle for water and aquarium objects supported in said frame structure and having front and rear sides extending across the front and rear sides of said frame structure, a picture supported across the rear side of said frame structure and viewable from the front of said aquarium, and a picture frame supported on the front side of said frame structure through which said aquarium and said picture may be viewed, means for adjustably supporting said picture frame at various inclinations with relation to the open inclined front side of said frame structure, comprising a yoke supporting the top edge of said picture frame and having front arm sections and side arm sections formed with elongated slots and extending along the sides of said frame structure, clamp screws fixedly mounted on the sides of said frame structure and engaging through said slots to pivotally and longitudinally adjustably support said yoke, and means on said frame structure below said side arm sections and engaging the bottom face thereof to assist in supporting said yoke in all of its pivoted adjustments, comprising bosses formed on the sides of said frame structure and below said side arm sections, and support screws threadedly engaged through said bosses and engaging the bottom face of said side arm sections.

3. In a wall aquarium, a frame structure for supporting a transparent receptacle for water and aquarium objects having an open inclined front side, and a picture frame adjustably mounted on the said open inclined front side and through which said aquarium is viewable, said adjustable mounting comprising means for pivotally mounting the bottom edge of said picture frame on the bottom of said frame structure, a yoke consisting of a front arm section and side arm sections extending along the sides of the frame structure and being formed with elongated slots, U-shaped clips having one of their arms attached to the top portion of said picture frame and the other of their arms extending over said front arm section for supporting the top of said picture frame on said yoke, and clamp screws mounted on the sides of said frame structure and engaging through said slots to pivotally and longitudinally adjustably support said yoke so that said clamp screws may be loosened to change the position of said yoke with relation to said frame structure to correspondingly change the inclination of said picture frame with relation to said open inclined side of said frame structure.

MORRIS SKOLNICK.